Nov. 25, 1924.
C. R. HAYS
1,516,964
DEMOUNTABLE RIM
Filed Jan. 6, 1921
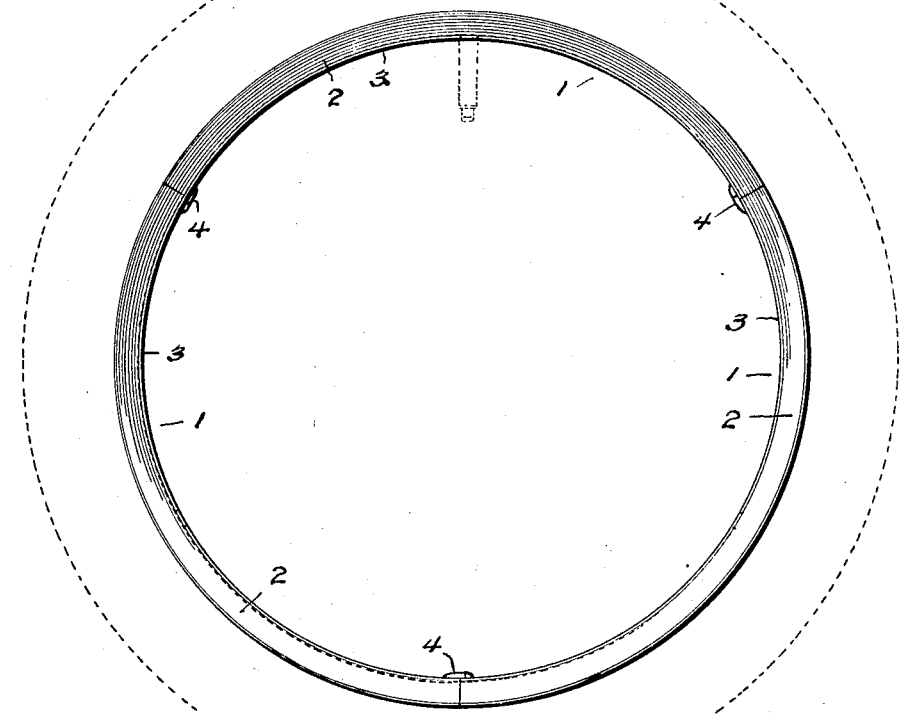
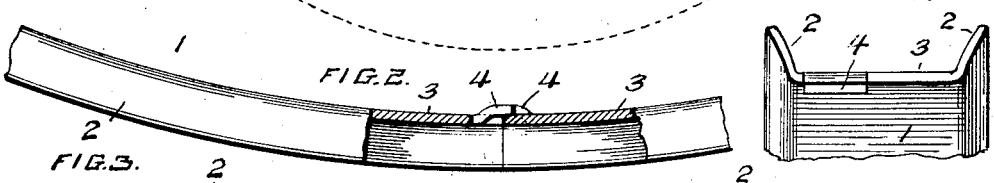
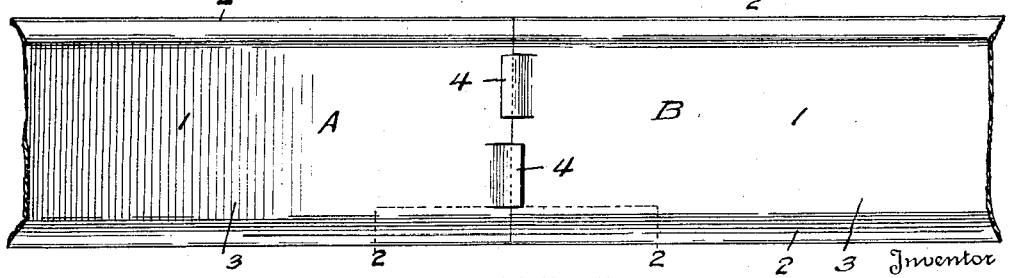
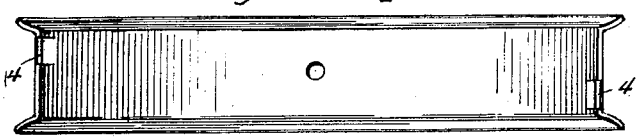

Patented Nov. 25, 1924.

1,516,964

UNITED STATES PATENT OFFICE.

CLAUD R. HAYS, OF CAMP HOLABIRD, MARYLAND, ASSIGNOR TO JOHN W. WEEKS, SECRETARY OF WAR OF THE UNITED STATES OF AMERICA, TRUSTEE.

DEMOUNTABLE RIM.

Application filed January 6, 1921. Serial No. 435,517.

(FILED UNDER THE ACT OF MARCH 3, 1883, 22 STAT. L., 625.)

*To all whom it may concern:*

Be it known that I, CLAUD R. HAYS, chief engineer of the Experimental Unit, M. T. C., and a citizen of the United States, stationed at Camp Holabird, Maryland, have invented an Improvement in Demountable Rims, of which the following is a specification.

The invention described herein may be used by the Government, or any of its officers or employees in prosecution of work for the Government, or by any other person in the United States, without payment of any royalty thereon.

This invention relates to an improved demountable rim, especially adapted for use on automobile or other vehicle wheels, using pneumatic or other tires.

The object is to provide a simple, durable and inexpensive structure, in which the cost of manufacture will be reduced to the minimum, as regards the number of operations required to produce the rim, the material required for its construction both as to amount and variety, and the number and variety of machines required for its production. All of the above tend to reduce the cost of production and increase volume production.

A further object is to provide a rim made up of a plurality of sections that are not permanently secured to each other and may be packed or nested for shipment or storage in the minimum amount of space, and free from danger of damage in transit.

These and other objects will appear in the following detail description and be finally pointed out in the claims.

Similar reference numerals indicated corresponding parts in all the figures of the drawings in which:

Fig. 1 is a side view partly in section of my improved demountable rim, showing a part of the pneumatic tire and felloe of the wheel in dotted lines.

Fig. 2 is a sectional view, showing on an enlarged scale the adjoining ends of two of the rim sections.

Fig. 3 is a plan view of the inside of the rim as shown in Fig. 2.

Fig. 4 is an edge elevation of the end of one of the sections.

Fig. 5 is a plan view of one of the sections showing both of its ends, and retaining ears, arranged to provide for interchangeable use of the sections.

By reference to the drawings it will be seen that the rim is made up of a plurality of sections of identical construction; each section being formed of a single piece of metal that may be rolled or pressed in a single operation into form ready for use. Each section being made from a single piece of sheet metal approximately one-eighth of an inch longer than the segment of the rim which it constitutes and that any number of sections so shaped as to form the proper portion of the entire rim may be used, said number of sections being preferably three or more, to provide for economical packing.

In view of the above, relating to the sections of equal length, it will be noted that each section will carry or sustain an equal amount of strains and stresses, that the coupling means between the sections are called on to sustain an equal amount of vibration and strain and therefore no portion or portions of the rim will have any greater tendency to bulge or collapse than any other, and there will be a perfect equalization of all strains throughout the entire rim, when in use on the felloe or in supporting the tire alone.

It is a well known fact that the arch formation will sustain the maximum amount of pressure but it is also fundamental that said arch must be of equal strength throughout and have no weak spots in it, and also that the support for the arch be able to sustain all that the arch will sustain.

The above fundamental principles are found in the structure here shown, and are not found in this art as previously developed. The so-called collapsible rims are in many instances strong in some places and extremely weak in others.

The similarity as to every detail of the sections of the rim here shown makes it necessary to describe in detail, a single section only.

In referring to the drawings by numerals, 1 indicates one of the sections of the rim, preferably three in number, each of said sections extending one-third or occupying 120° of the 360° of the entire circle.

The sections 1 are preferably rolled or pressed from a single piece of sheet metal of appropriate thickness and may be provided with flanges 2—2 of any preferred form, for use in retaining the tire in place thereon. Said flanges 2—2 being arranged along the edge of the flat or base portion of the rim as shown at 3.

At the ends of each section, lugs or ears 4 are preferably struck from the end of the section by simply splitting the metal to provide partly separated tongues that are bent out of line with the base portion 3, of the rim in which they are formed.

The ears 4 are of such length as to provide a very rigid construction, and extend when pressed to shape, approximately one-sixteenth of an inch or more, beyond the end of the section.

It will be seen that the ears 4 at the end of the sections, which may be termed coupling, or justifying ears are bent to lie inside of the base or flat portion of the adjoining section, and are arranged at one side of the center to provide an unobstructed space for the reception of the corresponding ear forming a part of the adjoining section.

In this manner a large percentage of the end of each section is not mutilated or otherwise weakened by rivets or the like and the end of the adjoining member is permitted to come into abutting and registering contact and is firmly maintained in said relative position by the ears 4.

While only one form and manner of providing and arranging ears 4 shown, it will be understood that a number of modifications would be equally effective.

In the structure shown, when the parts are assembled (see Fig. 3), it will be seen that the lug 4 on section "A" prevents the relative outward displacement of the section of which it forms a part, and prevents the inward displacement of the end of the abutting section "B", and at the same time the ear on the abutting section "B" prevents the outward displacement of the end of "B" and the relative inward movement of the end of "A".

Again it will be seen in this structure that the ears all lie on the inner surface of the rim and do not offer any obstruction to the seating of the securing bead at the base of the tire casing.

Each section may be provided with a valve stem opening at its middle to complete the interchangeability of the sections.

Slight changes in form and minor details of construction may be resorted to without departing from the spirit of this invention and will be within the scope of its claims.

What I claim and desire to secure by Letters Patent is:—

1. A demountable rim consisting of a plurality of sections all provided with ears struck from both ends thereof, and bent in the same direction to receive the ends of adjoining sections.

2. A demountable rim consisting of a plurality of sections all provided with ears at one side of their centers struck from both ends thereof and bent in the same manner to receive the ends of adjoining sections.

3. A demountable rim consisting of a plurality of interchangeable and reversible sections provided with ears struck from the ends thereof and bent to lie on the inside of the adjoining section of the rim only.

4. A demountable rim made up of a plurality of unattached sections of identical construction for interchangeable use, each section being formed from a single piece of metal and provided with ears struck from the stock at each of its ends, said ears arranged at corresponding distances on opposite sides of the center of the rim and at opposite ends of the section, said ears bent to lie beneath the end of a corresponding adjoining section, to form with its ear a coupling between the sections to prevent relative lateral movement of the ends of the section.

CLAUD R. HAYS.